United States Patent [19]

Thijssen et al.

[11] Patent Number: 4,735,781
[45] Date of Patent: Apr. 5, 1988

[54] APPARATUS FOR CONCENTRATING A SUSPENSION

[75] Inventors: Henricus A. C. Thijssen, Son; Gerardus J. Arkenbout, Zeist, both of Netherlands

[73] Assignee: Nederlandse Centrale Organisatie Voor Toegepast Natuurwetenschappelijk onderzoek Juliana Van Stolberglaan, The Hague, Netherlands

[21] Appl. No.: 756,939

[22] Filed: Jul. 19, 1985

Related U.S. Application Data

[63] Continuation of Ser. No. 506,336, Jun. 21, 1983, abandoned.

[30] Foreign Application Priority Data

Jun. 22, 1982 [NL] Netherlands ............ 8202517

[51] Int. Cl.⁴ .................... B01D 9/00; B01D 9/04
[52] U.S. Cl. ................... 422/251; 62/317; 210/255; 210/323.2; 210/332; 210/407; 422/252
[58] Field of Search .............. 210/323.2, 255, 332, 210/407; 422/251, 252; 62/123, 317, 532

[56] References Cited

U.S. PATENT DOCUMENTS

| 2,854,494 | 9/1958 | Thomas | 260/674 |
| 3,606,016 | 9/1971 | Sasaki | 210/323.2 |
| 4,188,797 | 2/1980 | Thijssen et al. | 62/123 |
| 4,298,474 | 11/1981 | Sillers | 210/323.2 |
| 4,332,140 | 6/1982 | Thijssen et al. | 62/123 |
| 4,332,599 | 6/1982 | Thijssen et al. | 62/542 |
| 4,341,085 | 7/1982 | Nail | 62/124 |

OTHER PUBLICATIONS

A. I. Lloyd, "An Integral Design for Desalination Plant Using the Secondary Refrigerant Freeze Process", *Desalination*, 21, (1977), 137–146.

*Primary Examiner*—Peter Chin
*Attorney, Agent, or Firm*—Brumbaugh, Graves, Donohue & Raymond

[57] ABSTRACT

An apparatus for concentrating a suspension consisting of a hollow cylinder in which one or more tubes of a constant outward diameter extend in axial direction, in the wall of each tube at least one filter being mounted forming the only direct connection between the interior of the tube and the interior of the cylinder. Two or more of such apparatus can be connected in series in order to form a cascade.

21 Claims, 4 Drawing Sheets fig-1

APPARATUS FOR CONCENTRATING A SUSPENSION

This application is a continuation of application Ser. No. 506,336, filed June 21, 1983, abandoned.

The invention relates to an apparatus for concentrating a suspension, which apparatus consists of a concentration zone surrounded in a radial direction by a wall, of which concentration zone the cross-section perpendicular to the center line is constant and which apparatus is provided with means for the supply of suspension at the beginning of the concentration zone, with one or more filters near the end of the concentration zone, with means for removing the liquid passed through the filters, with means for removing concentrated suspension at the end of the concentration zone, and with means for the generation of a pulsating flow in the concentration zone.

Furthermore, the invention relates to a cascade for effecting a complete separation between crystals and melt by means of two or more of the apparatus mentioned above which are connected in series. However, a complete separation between crystals and mother liquor can only be obtained if the crystals are subjected to a countercurrent wash process before leaving the last apparatus.

An apparatus for concentrating a suspension is known from U.S. Pat. No. 2,854,494. This patent specification describes a crystal wash column in which in a cylindrical room a crystal suspension is concentrated by directing this suspension along a portion of the cylindrical wall which contains one or more filters. At least a substantial portion of the liquid in the suspension is removed through these filters. The crystals substantially rid of liquid, thus in a concentrated suspension, are transferred along the filters and removed by a way different from that of the liquid. In this known apparatus the liquid and the crystals of the suspension to be treated initially move in the same direction. In the filters mounted in the wall, however, the greater part of the liquid is removed sideways, while the crystals continue to move in the same direction.

A serious disadvantage of this known apparatus is that a homogeneous flow of washing liquid through the crystal bed is not possible. Since the filters are exclusively located in the column wall in the neighbourhood of the filters there is not an axial liquid flow which is equal over the entire cross section of the column, but a substantially radial liquid flow directed towards the filter. This causes a very undesirable preferential flow in the neighbourhood of the filters due to which the liquid does not flow to the filters along a short flow path but along a long one part of which can be located—seen in the direction of the transport of the solid material—far beyond the filters. Needless to say a uniform washing out of the crystal bed over the entire cross section of the column and the obtaining of a homogeneous product become illusory. This disturbing effect of the filters mounted in the wall on the liquid flow in the crystal bed increases with a larger column diameter.

A second disadvantage of this known apparatus is that in the neighborhood of the filter a densely packed crystal bed is formed, on which a big force has to be exercised for its transfer due to the fact that the friction between such a packed bed and the wall of the column can be very considerable. This big force exercised on the concentrated suspension involves a considerable energy consumption, while moreover there is the risk of deforming or damaging the crystals as a result of this big force. In the known apparatus according to the cited US patent specification the wall friction, and consequently also the force exercised on the concentrated crystal suspension, is decreased by maintaining a pulsating liquid flow in the column. Moreover, high demands are made upon the inside measurements of the columns, i.e. the inner cross section has to have the same size and shape all over the column in order to reduce the friction between the packed crystal bed and the wall to acceptable proportions. A narrowing of the inner cross section of the column would result in a compression in radial direction of the crystal bed and, consequently, the occurrence of excessively big friction forces. Due to a gradual widening of the inner cross section of the column in the direction of the material transfer the friction and the force to be exercised on the crystal bed could be reduced, it is true, but also an increasingly strong liquid flow between the wall and the crystal bed would occur disturbing a uniform liquid flow through the bed itself.

In addition to the objections set forth above connected with the friction between the packed crystal bed and the wall, the known column according to the cited US patent specification has a further more serious disadvantage.

The object of the invention is to provide an apparatus for the concentration of a suspension which apparatus does not have the disadvantages mentioned above, or at least in a substantially reduced measure.

The invention is based on the insight that the liquid flow in a crystal bed in a column is disturbed substantially less when the filters are not, or at least not exclusively, mounted in the column wall, but evenly distributed over the entire cross section of the column. Such as array of the filters, however, must be such that the form and the size of the cross section of the concentration zone are constant over the whole length of the column as in case of a decreasing cross section the concentrated crystal bed cannot be transferred, while in case of an increasing cross section the formation of channels occurs along the wall.

The object of the invention is, therefore, achieved with an apparatus as indicated above, which apparatus is characterized according to the invention in that one or more tubes of a constant outer diameter extend from the beginning of the concentration zone in axial direction through the concentration zone, and that in the wall of each tube at least one filter is mounted forming the only direct connection between the interior of the tube and the concentration zone.

With this measure, naturally combined with a careful measurement of the concentration zone, on the one side a uniform removal of the liquid over the whole cross section of the zone is obtained, and on the other side, also by the applied pulsating flow, an acceptable friction between the packed crystal bed, the wall of the concentration zone and the surface of the tubes is obtained.

In a preferred embodiment of the apparatus according to the invention the concentration zone has a circular cross section, the tubes are distributed evenly over this cross section covering only a small portion of this cross section.

Preferably in each tube a portion of the wall with a length equal to a multiple of the outer tube diameter is carried out as a filter.

The filters can be mounted not only in the tube walls, but also in the wall of the concentration zone. Preferably all filters are equidistant from the end of the concentration zone.

The pulsating flow can be generated in many ways; in a preferred embodiment the rate of the removal of the liquid passed through the filters is changed periodically, including the periodical closure of this removal. A pulsation device generally comprises a piston moving to and fro, and an expansion chamber in another part of the apparatus.

As no excessively big forces need to be exercised on the crystal bed in the device according to the invention, the crystal bed is transferred exclusively by the presence of the passing liquid. This prevents a.o. deformation and damage of the crystals in the bed. The concentration of the crystal bed increases in the direction of the filters and consequently also the pressure exercised by the liquid in axial direction of the bed. This pressure must be bigger than the opposing forces, mainly the friction. The force on the crystal bed is determined by the pressure drop of the liquid over the bed between the inlet of the suspension and the liquid removal through the filters. The pressure drop can be increased by extending the length of the bed or by increasing the flow rate of the liquid. If the suspension to be concentrated contains too little liquid to cause the desired pressure through the liquid on the crystal bed, a portion of the liquid passed through the filters can be recycled, as a result of which the pressure on the bed increases. In fact, this boils down to a decrease of the particle density of the suspension to be concentrated at the beginning of the concentration zone.

The concentrated suspension which has moved along the filters can e.g. be removed by means of a scraper.

The suspension concentrated in the apparatus according to the invention, which suspension has been treated in this apparatus with a liquid in concurrent can then be treated in a washing zone in countercurrent with another liquid. This washing zone can form a unit with the apparatus according to the invention described above, and be mounted between the filters of the concentration zone and the means for the removal of the concentrated suspension. In the washing zone the concentrated suspension is transferred in the same direction in which it moved in the concentration zone, while at the end of the washing zone, averted from the concentrated zone, a washing liquid is supplied which moves in countercurrent through the concentrated suspension. The washed concentrated suspension is preferably transported to a rinsing chamber where the concentrated and washed solid particles are again suspended in a liquid phase which is at the same time used as a washing liquid. The pulsating flow in the concentration zone can be generated by periodically changing the flow rate of the washing liquid to be supplied.

When the apparatus according to the invention is used for the separation of a mixture of substances by means of crystallization, a crystallizer is—seen in the direction in which the crystals move—positioned before the concentration zone, in which crystallizer the mixture to be separated, which is liquid in normal conditions, is partly crystallized by cooling down, thus forming the crystal suspension which is supplied to the concentration zone. If the mixture of substances to be separated is solid in normal conditions, the crystal suspension can be prepared by partly melting this mixture. Further, a device can be mounted—seen in the direction of the movement of the crystals—after the washing zone, in which device the crystals or the crystal suspension removed from the washing zone, are molten and part of the melt is recycled as washing liquid to the washing zone.

The apparatus is provided with means for a controlled dosage of washing liquid. The control signal is obtained by measuring the temperature, concentration etc in the washing zone or in the rinsing chamber. The dosage of the washing liquid can be controlled by adjusting the pressure of washing liquid in the rinsing chamber.

If crystallization takes place from a melt, so-called washing front occurs in the washing zone, i.e. the place where the temperature and the concentration gradients are maximal. The washing liquid supply is preferably controlled in such a way that this washing front is located in the washing zone about halfway between the filters and the device for removal of the concentrated suspension.

Should the washing front be located at or in the neighbourhood of the filters, these could get clogged up by crystal growth.

In the case of crystallization from a solvent whereby the crystals are separated out as a solid product, a saturated solution of pure product in a solvent can be used as washing liquid. It is then advantageous to adjust the washing liquid supply in such a way that a small flow rate of washing liquid flows through the entire washing zone and is removed through the filters.

In the case of crystallation from a solvent the apparatus can profitably be used as a preliminary stage for centrifuging or filtering. By connecting an apparatus according to the invention before a centrifuge or a filter a complete separation of mother liquor is obtained while a minimum quantity of washing liquid is used. The apparatus according to the invention can in particular be applied profitably or washing sugar crystals and anorganic salts such as cooking salt.

The crystals can move in the form a packed bed through the washing zone. It is recommendable that the filter tubes extend through the washing zone to the removal device, since otherwise, in direct line with the tubes, channels could be formed in the packed bed.

Another possibility is to mix the concentrated suspension and the washing liquid in radial direction so that there is no packed bed. Stirring can be effected by means of a stirring device comprising a rotor, the axis of which is coaxial with the centre line of the washing zone and which rotor is at least over part of its length provided with radially outwardly protruding rotor pins, while the washing zone is surrounded by a cylindrical jacket provided with radially inwardly protruding stator pins.

Furthermore, for the construction of this washing zone and the way in which the washing is done therein, reference is made to a second patent application, Ser. No. 506,330 filed in applicants' name on the same date as the present patent application, which second patent application relates to a method and apparatus for treating suspended particles with a liquid in countercurrent.

In the case of crystallization from the melt and heavily polluted mother liquors are used the desired complete separation between crystals and mother liquor cannot be realized by means of only an apparatus according to the invention with a packed crystal bed.

The crystallization temperature of such a mother liquor can be from 50° to 75° C. lower than that of the pure main component to be separated. This means that under such circumstances the crystals in the column are able to be heated up by from 50° to 75° C. This is only possible if the heat required for this is withdrawn from the washing liquid. Due to this part of the washing liquid crystallizes which results in a decrease of the porosity of the packed bed. This decrease of the porosity may not be so strong that a total or at least substantial closing of the packed bed occurs. Since the specific heat of most substances amounts to about 1% of the melting heat the maximal allowable temperature difference is about from 20° to 40° C. at a bed porosity of about from 0.4 to 0.5 which frequently occurs in packed bed of crystals.

The required washing pressure for causing the flow rate of the washing liquid increases as the bed porosity decreases. Due to this a greater driving force is needed for the forced crystal transfer against the washing pressure towards the melting circuit. In that case the crystal transfer consumes relatively much energy and the hydraulic forces may be too small for realizing the desired capacity of the crystal transfer.

If there is a great temperature difference between the supplied crystals and the pure product a complete separation between crystals and mother liquor can nevertheless be realized if two or more apparatus according to the invention are connected to form a cascade. Often two apparatus are sufficient for bridging the temperature difference between the supplied suspension and the pure substance. The following observation is therefore and for the sake of simplicity limited to a cascade of two apparatus according to the invention.

The crystal suspension to be treated is supplied to the first apparatus and concentrated. The concentrated crystal mass is again suspended in the rinsing chamber with mother liquor from the second apparatus and is as diluted suspension transferred to the second apparatus.

The process conditions can be set in such a way that in each apparatus there occurs a stationary washing front. In the second apparatus a pure melt of crystals is again used as washing liquid. In the first apparatus the washing liquid is the mother liquor from the second apparatus.

The heat required for increasing the temperature of the crystals in the first apparatus is withdrawn from the mother liquor from the second apparatus which functions as washing liquid, due to which this mother liquor partially crystallizes.

Due to the partial crystallization of the mother liquor from the second apparatus which mother liquor functions as washing liquid, the concentration of the impurities increases and due to this the corresponding equilibrium temperature drops.

A controlled quantity of melt of pure crystals is fed to the rinsing chamber of the first apparatus in order to undo the change of the concentration caused by the extra crystal growth. Since the equilibrium temperature is a good measure for the composition of the liquid the addition of the melt to the rinsing chamber is controlled based on a temperature measurement in the rinsing chamber.

Preferably a cascade of two apparatus according to the invention is provided with means for a sluice in the pipe line between the mother liquor removal in the second apparatus and the inlet of the rinsing chamber in the first apparatus.

By using a sluice a complete separation of crystals and mother liquor is possible in such a cascade without the occurrence of a stationary washing front in the first apparatus.

When a sluice is used a small quantity of mother liquor together with the concentrated crystal mass is removed in the first apparatus towards the rinsing chamber. During the passage of the crystals through the first apparatus the crystals remain in contact with mother liquor having the original composition. Thus it is possible to separate a substantial part of the mother liquor at a constant temperature of the crystals. The required heat is withdrawn in the rinsing chamber from the liquid phase. The extra crystal growth takes place in a diluted suspension. In this way any temperature difference can be bridged since no closing and clogging of the crystal bed occurs.

The liquid which is removed through the sluice is recycled to the crystal bed. The quantity that is sluiced is not only determined by the quantity of mother liquor that is allowed to be carried along together with the crystals in the first apparatus, but also by the concentration difference between the mother liquor and the liquid in the rinsing chamber (which is the mother liquor of the second apparatus). As the impurity concentration is higher in the rinsing chamber, the mother liquor carried along is less diluted and a smaller quantity is sluiced which results in a smaller loss factor due to the sluice.

Instead of pure product the starting material to be crystallized can often be fed to the rinsing chamber of the first apparatus in order to undo the change of the concentration caused by the extra crystal growth. The addition of feed to the rinsing chamber of the first apparatus has the advantage of heat recuperation as the cold content of the crystals transferred by the first apparatus can be used for partial crystallization of the starting material.

The invention will be explained with reference to the drawings.

FIG. 3 is a diagram of a cascade of two apparatus connected in series each with a zone with a packed bed. Pure product is fed to the rinsing chamber of the first apparatus, from which product the heat can be withdrawn required for increasing the temperature of the crystals.

Figure 1:
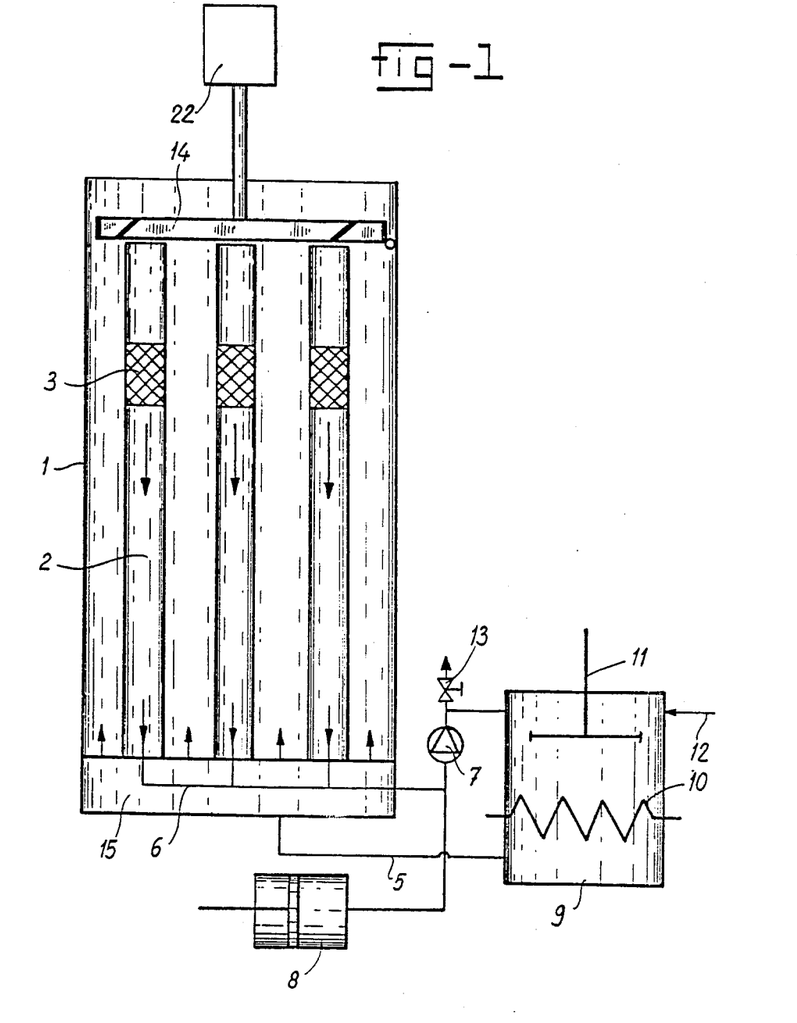
FIG. 1 shows a diagram of the apparatus according to the invention for concentrating a suspension.

The device according to FIG. 1 consists of a hollow cylindrical body 1 of e.g. glass, with one or more tubes 2 in it, positioned in longitudinal direction and each provided with a filter 3 over a length which is a multiple of the diameter of the tube. The tubes are mounted in a fixed place in the column and evenly distributed over its inner cross section. The cross section of the tubes covers only a fraction of the surface of the inner cross section of the cylinder. At one end the apparatus is provided with means for the removal of concentrated suspension, viz. a rotatable knife 14 with a drive 22. At the other end a line 5 is available for supply of suspension, which line 5 ends in a mixing chamber 15 from which the suspension is carried into cylinder 1, evenly distributed over its cross section. The filtered liquid is removed through lines 6 and a pump 7.

The filters are located in such a way that the distance between the suspension inlet and the filters is three to four times the distance between the suspension outlet and the filters.

The wall friction at the filters 3 can be reduced by generating a pulsating liquid flow in the removal line of the liquid by means of a piston in a cylinder 8.

The suspension to be concentrated can be a crystal suspension, prepared in a crystallization vessel 9 with a scraped cooler 10. The desired mixing in vessel 9 is obtained by a stirrer 11. The mixture to be crystallized is supplied through a line 12; the mother liquor can be removed through a control valve 13 and/or be recycled by a pump 7 as the circumstances may require.

Figure 2:
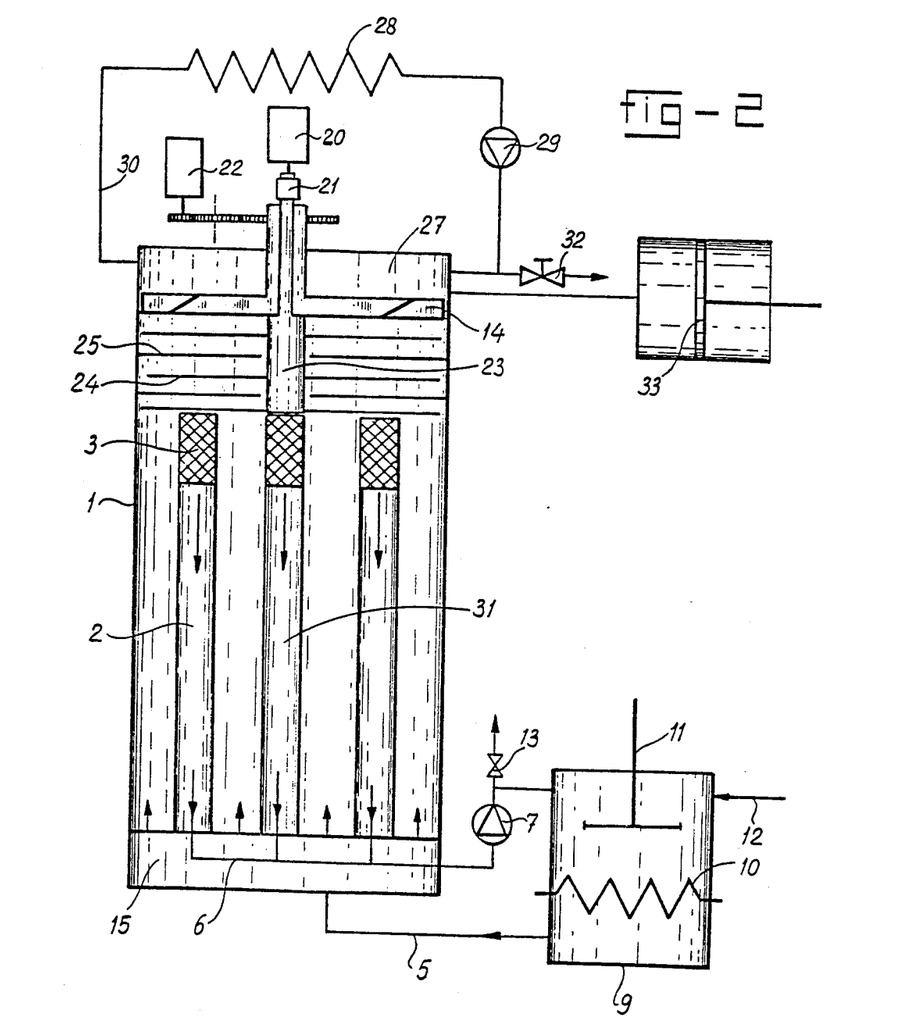
FIG. 2 is a diagram of the apparatus of FIG. 1 combined with a washing zone which is stirred.

FIG. 2 is a diagram of a combination of the apparatus of FIG. 1 with a washing zone which is stirred.

The reference number 1 substantially indicates the apparatus according to FIG. 1. Corresponding component parts are indicated with the same reference numbers as in FIG. 1.

Between the filters 3 and the crystal removal 30 a stirring device is mounted for tangential stirring the concentrated crystal suspension. This stirring device consists of a rotatable shaft 23 with rotor pins 24, in combination with stator pins 25 fixed in the wall. The rotatable shaft 23 is in direct line with the central filter pipe 31 in order to hamper the transfer of the concentrated crystal suspension as little as possible.

The crystal suspension is then transferred via a rotatable knife 14 with a drive 22 to a melting circuit consisting of a rinsing chamber 27, a heat exchanger 28 and a pump 29. A substantial portion of the crystals is removed as product through a control member 32. The other part of the molten crystals is recycled as washing liquid to the washing zone.

A portion of the washing liquid crystallizes in the washing zone and consequently the volume fraction of the solid matter increases in the washing zone. By using a tangential stirring, however, it can be provided that the crystals remain loose in respect of each other and that the washing pressure does not increase. By mounting a dynamometer 21 between the drive of the stirring device 20 and the rotatable shaft 23 the torque exerted on the stirrer can be measured and on the basis thereof the volume fraction of solid mater in the crystal mass in the washing zone can be controlled.

The wall friction is reduced by a pulsating liquid flow caused by a piston 33 at the removal of the crystals.

FIG. 3 is a diagram of two apparatus according to the invention connected in series. Both apparatus consist of a washing zone with a packed crystal bed. In the first apparatus to which the suspension is fed corresponding component parts are indicating the same reference numbers as used in FIGS. 1 and 2, but increased by 100. In the second apparatus the reference numbers of FIGS. 1 and 2 are increased by 200. The number of filter pipes in each apparatus amounts to 10-100 per square meter of cross section of the column. A crystal suspension from a crystallizer is fed to apparatus 101 via line 141 and by means of pump 140. Via line 142 the mother liquor is recycled to the crystallizer and if needed partially sluiced as a waste flow. The concentrated crystal mass obtained in 101 is via a rotatable knife 114 transferred to rinsing chamber 127 and suspended with mother liquor from the second apparatus 201 which is fed to the rinsing chamber 127 through line 242. The crystals from 101 are suspended in this mother liquor and fed to the second apparatus by means of pump 240. In the second apparatus the suspension is again concentrated, the crystals are transferred to the rinsing chamber 227 by means of the knife 214 and thereafter they are suspended, molten by means of heat exchanger 228 and substantially removed as molten product by control means 232. A complete separation between crystals and mother liquor is effected by establishing a stationary washing front by means of a temperature sensor 234.

By means of a control means 148 such a value of the sluice is set (to be read by means of flow meter 147) that in this apparatus 101 no stationary washing front occurs in the packed bed, but that a minimal quantity of mother liquor is removed together with the crystal mass. Thus the crystals remain in contact with the original mother liquor and only just under the knife there is a limited temperature rise of the crystals. In the rinsing chamber 127 the crystals are suspended with mother liquor from 201 having a lower impurity concentration and consequently a higher equilibrium temperature. Thus the temperature of the crystals increases. The heat required for this is withdrawn from the liquid phase which due to this partially crystallizes.

The supply of a melt of pure crystals by means of control means 146 and temperature sensor 145 sets the temperature of the mother liquor and thus also the impurity concentration in the rinsing chamber at a certain desired value.

The liquid pressure level of the apparatus 201 can relative to the liquid pressure level of the apparatus 101 be increased according to the needs by means of throttle valve 249. By controlling the throttle valve 249 by pressure sensor 250 one is assured that possible washing pressure changes in the rinsing chamber 127 do not influence the liquid pressure level in the apparatus 201.

The mother liquid which together with the crystals is removed in the apparatus 101 to the rinsing chamber 127 is diluted with the melt supplied via 146 until the set value is obtained. The sluiced material is removed to a suitable point in the crystallization cascade.

In order to dilute as little as possible the mother liquor which together with the crystals is removed in the apparatus 101 to the rinsing chamber 127, the impurity percentage of the mother liquor circulating between the apparatus 101 and 201 is preferably chosen as high as is still compatible with a good functioning of the apparatus 201.

Possible fluctuations in the crystal transfer are compensated by controlling the liquid flow rate through the crystal bed based upon a partial recycling of the mother liquor in such a way that the position of the crystal front, i.e. the position of the transition from diluted suspension to the compact bed is kept stationary. Keeping the crystal front at the same place in the apparatus 101 and 201 is realized by means of sensors 143 and 243 for measuring the difference between the dragging forces of the suspension and the bed and the pumps 144 and 244.

It is clear that in this way with a cascade of two or more apparatus according to the invention any occurring temperature difference between fed crystals and crystals in contact with a pure melt can be bridged.

Figure 4:
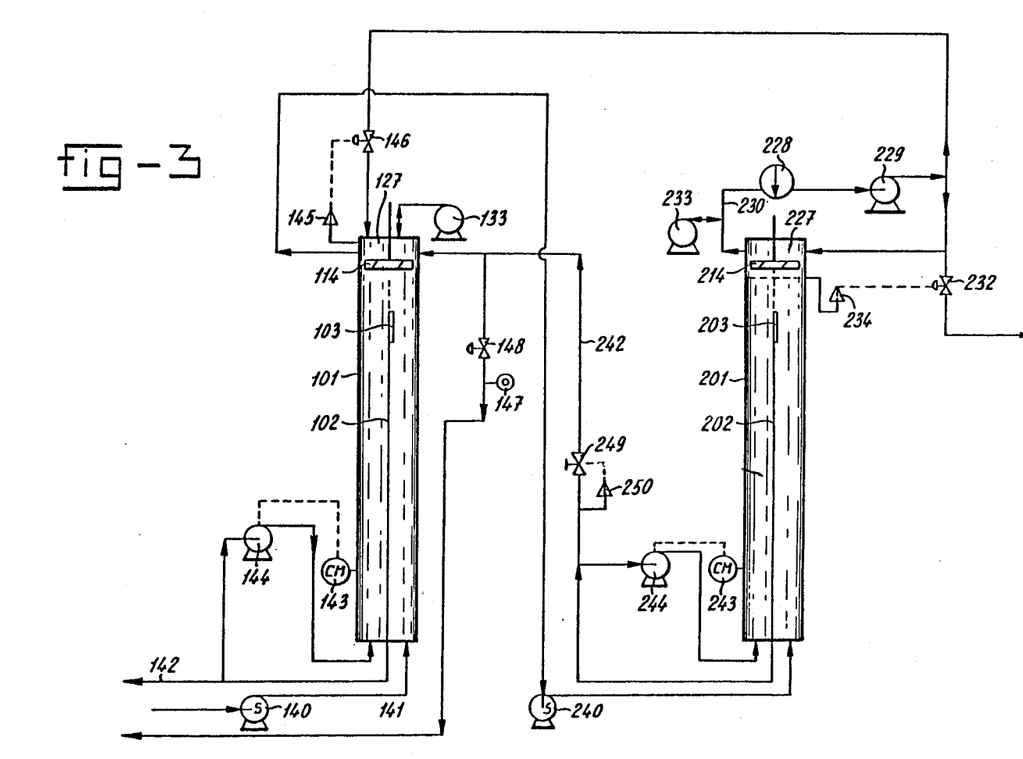
FIG. 4 is a diagram of a cascade of two apparatus according to the invention connected in series, in which, instead of pure product the starting material to be crystallized is fed to the rinsing chamber of the first apparatus.

FIG. 4 shows a cascade of two apparatus according to the invention connected in series, in which no melt of pure crystals is supplied to the rinsing chamber of the first apparatus, but part of the starting material to be crystallized. Corresponding component parts are indicated with the same reference numbers as in FIG. 3. The only difference with the diagram of FIG. 3 is that, instead of melt of pure crystals, starting material to be crystallized is fed by means of pumps 149 to rinsing chamber 127, and that the sluice is controlled on the basis of a temperature measurement in the rinsing chamber.

The heat required for increasing the temperature of the crystals transferred by 101 is withdrawn from the supplied starting material which due to this partially crystallizes.

When the starting material can already partially crystalize in the rinsing chamber 127 less heat has to be withdrawn in the crystallizer. Thus the heat exchanging surface in the crystallizer can be smaller. The supply of starting material to the rinsing chambers of the first apparatus consequently does not only lead to energy saving but also to a decrease of the investment cost.

If the composition of the mother liquor circulating between 101 and 201 can be chosen in such a way that the impurity percentage is some units lower than that of the starting material even the total feed can be supplied to the rinsing chamber 117.

EXAMPLE I

The purification of para-xylene was carried out in a separation apparatus which substantially corresponded to the diagram of FIG. 2.

The crystallizer consisted of a simple outwardly scraped and inwardly cooled heat exchanger with a length of 500 mm and a diameter of 300 mm positioned in a vessel with a length of 600 mm and a diameter of 500 mm. The heat exchanger and the vessel were substantially made of stainless steel.

The suspension concentrator had a length of 1000 mm and an inner diameter of 200 mm and contained seven filter pipes, each with a diameter of 25 mm. The length of the filters was 40 mm, the diameter of the filter openings 0,5 mm, and the filters were mounted at 300 mm from the crystal removal side.

Between the filters and the scraping knife a rotatable shaft with rotor pins was mounted. In seven layers perpendicular to the shaft axis rotor pins were mounted with a diameter of 8 mm; each layer comprised eight pins. The distance between the layers was 25 mm. As many stator pins 5 were mounted in the wall. The frequency of the liquid pulse was $1$ sec.$^{-1}$ and the pulse mass about 0.2 kg.

The feed mixture consisted of para-xylene polluted with 20 wt. % ortho-xylene, meta-xylene and ethylbenzene. The temperature in the crystallizer was $-20°$ C. Of the total feed of 270 kg/h 180 kg were crystallized, while the 90 kg of non-crystallized liquid was removed as waste flow.

The waste flow contained stil about 40% para-xylene. At the side of the crystal removal 240 kg of crystals per hour were molten and about 180 kg/h were removed as 99.97% pure product (para-xylene).

The circulation rate of the mother liquor amounted to 1500 l/h.

A production of 180 kg/h yields at 8000 working hours per year an annual production of 1440 tons. With larger aparatus of the present type capacities of 100,000 tons and more per annum can be realized.

EXAMPLE II

The separation of para-xylene crystals from mother liquor was carried out in a separation apparatus which substantially corresponded with the diagram of FIG. 3.

The apparatus 101 and 201 had both a length of 1000 mm and an inner diameter of 150 mm and each contained six filter pipes with a diameter of 20 mm. The length of the filters amounted to 30 mm, the diameter of the filter openings to 0.3 mm and the filters were situated at a distance of 300 mm from the crystal removal side.

By means of pump 140 a mixture was supplied containing 100 kg/h of para-xylene crystals and 400 kg/h of mother liquor comprising about 70% wt. of impurities. The temperature of this mixture amounted to $-30°$ C. The temperature of the rinsing chamber was kept at $-10°$ C. Through 146:6 kg/h of a melt of pure crystals was supplied. Through 148 1.6 kg/h liquid containing 55% wt. of para-xylene was removed. The circulation rate of 240 amounted to about 500 kg/h. Through 232 100 kg/h of 99.97% wt. pure paraxylene could be removed.

A production of 100 kg/h yields at 8000 working hours per year an annual production of 800 tons. With larger apparatus of the present type capacities of 100,000 tons and more per annum can be realized.

We claim:

1. Apparatus for concentrating a suspension comprising:
   a closed, hollow cylindrical column having a central axis therethrough, said column having an interior with a cross-section, perpendicular to said axis, that is constant along said axis, said interior defining a concentration zone extending axially from one end of the column to at least near the opposite end of the column;
   means for supplying suspension to said one end of the column;
   means for removing concentrated suspension at said opposite end of the column;
   at least one tube axially disposed in said column and extending from said one end toward said opposite end through said concentration zone, said at least one tube having an outer wall of constant diameter, and at least one filter, in said wall near said opposite end, forming the only direct communication between the interior of the column and the interior of the tube;
   means communicating with the interior of each said tube for removing liquid passed through said filter;
   means for controlling the relative rates of supplying suspension and removing concentrated suspension for maintaining a packed bed of concentrated suspension in said interior that extends axially from a position between said filter and said one end toward said opposite end through said concentration zone; and
   means acting on the liquid of said suspension for urging said liquid through said packed bed toward said filter, whereby the presence of the packed bed results in a liquid pressure differential between said one end and said filter, said pressure differential imparting a force on the packed bed toward said opposite end.

2. Apparatus as defined in claim 1, wherein said interior has a circular cross-section, and wherein said at least one tube comprises a plurality of tubes distributed evenly over said cross-section and sized to cover only a relatively small portion of said cross-section.

3. Apparatus as defined in claim 1, wherein said at least one filter of each tube is disposed in a portion of the wall with a length equal to a multiple of the outer tube diameter.

4. Apparatus as defined in claim 1, comprising means for generating a pulsating flow in said interior.

5. Apparatus as defined in claim 4, wherein said means for generating a pulsating flow comprises a member for periodically changing the rate of the removal of liquid passed through said filters.

6. Apparatus as defined in claim 1, comprising means for recycling part of liquid passed through the filters to said one end of said concentration zone for controlling the level of the packed bed and therefore the rate of transport between said one end and said filter.

7. Apparatus as defined in claim 1, wherein said means for removal of concentrated suspension comprises a scraper.

8. Apparatus as defined in claim 1, wherein said filters are axially spaced from said means for removing concentrated suspension a distance to define a washing zone between said concentration zone and said means for removing concentrated suspension, and said apparatus further comprises means for supplying a washing liquid to said washing zone under pressure for moving countercurrent to said suspension.

9. Apparatus as defined in claim 8, wherein said column includes a rinsing chamber communicating with said means for removing concentrated suspension such that said means for removing concentrated suspension removes said suspension to said rinsing chamber, and comprising means for re-suspending the wased, concentrated crystal mass.

10. Apparatus as defined in claim 8, comprising means for controlling the pressure, and thereby the dosage, of washing liquid supplied to said washing zone.

11. Apparatus as defined in claim 8, comprising stirring means disposed in said interior between said tubes and said means for removing concentrated suspension, thereby to be in said washing zone, said stirring means including a rotor coaxial with the axis of said column, which rotor has, at least over part of its length, radially outwardly protruding pins and wherein said stirring means further comprises radially inwardly protruding pins disposed on the wall of said interior in said washing zone.

12. Apparatus as defined in claim 8, comprising means for generating a pulating flow in said interior, including a member for periodically changing the flow rate of the washing liquid to be supplied.

13. Apparatus as defined in claim 1, for separating a mixture of substances by crystallization, comprising crystallizer means disposed upstream of the means for supplying suspension.

14. Apparatus as defined in claim 8, for separating a mixture of substances by crystallization, comprising means, communicating with said means for removing concentrated suspension, for melting and subsequently partially recycling, as a washing liquid to the washing zone, the removed and melted crystal suspension.

15. Cascade for concentrating a suspension, including a first apparatus as defined in claim 1, and a second apparatus substantially similar thereto, wherein the container of at least said first apparatus further includes a rinsing chamber communicating with said means for removing concentrated suspension for receiving said concentrated suspension, said cascade further including means for communicating said first and second apparatus in series comprising:
first conduit means for connecting the rinsing chamber of said first apparatus with said means for supplying suspension to said concentration zone of said seond apparatus; and
second conduit means for connecting the means for removing liquid of said second apparatus with said rinsing chamber of said first apparatus.

16. Cascade as defined in claim 15, for separating crystals from a suspension comprising a melt, wherein the container of said second apparatus includes a rinsing chamber communicating with said means for removing concentrated suspension for receiving said concentrated suspension, said cascade further including:
recyling means communicating with the means for removing liquid in said first apparatus, for recycling said liquid to the concentration zone of said first apparatus;
a heat exchanger;
third conduit means for communicating said rinsing chamber of the second apparatus to said heat exchanger; and
fourth conduit means for connecting the output of said heat exchanger to the rinsing chamber of said second apparatus and to a product outlet line, for recycling and removing, respectively, suspension from the rinsing chamber of said second apparatus.

17. Cascade as defined in claim 16, wherein said fourth conduit means includes means for connecting the output of said heat exchanger to the rinsing chamber of said first apparatus.

18. Cascade as defined in claim 16, further comprising sluice means connected with said second conduit means.

19. Cascade as defined in claim 18, comprising means for supplying fresh feed to the rinsing chamber of said first apparatus, and control means responsive to the temperature in the rinsing chamber of said first apparatus for controlling said sluice means.

20. Cascade as defined in claim 17, comprising at least one more apparatus, substantially similar to said first and second apparatus, and connected in series to said second apparatus.

21. Cascade as defined in claim 19, comprising at least one more apparatus, substantially similar to said first and second apparatus, and connected in series to said second apparatus.

* * * * *

UNITED STATES PATENT AND TRADEMARK OFFICE
CERTIFICATE OF CORRECTION

PATENT NO. :  4,735,781
DATED      :  April 5, 1988
INVENTOR(S):  Thijssen et al.

It is certified that error appears in the above-identified patent and that said Letters Patent is hereby corrected as shown below:

Col. 2, line 36, "Such as" should read --Such an--.

Col. 5, line 13, after "in" insert --a--.

Col. 9, line 62, "aparatus" should read --apparatus--.

Col. 11, line 31, "wased" should read --washed--; and
        line 48, "pulating" should read --pulsating--.

Signed and Sealed this

Twenty-third Day of August, 1988

Attest:

DONALD J. QUIGG

Attesting Officer

Commissioner of Patents and Trademarks